(12) United States Patent
Yehia et al.

(10) Patent No.: US 8,271,750 B2
(45) Date of Patent: Sep. 18, 2012

(54) ENTRY REPLACEMENT WITHIN A DATA STORE USING ENTRY PROFILE DATA AND RUNTIME PERFORMANCE GAIN DATA

(75) Inventors: Sami Yehia, Boulogne Billancourt (FR); Marios Kleanthous, Cambridge (GB)

(73) Assignee: ARM Limited, Cambridge (GB)

( * ) Notice: Subject to any disclaimer, the term of this patent is extended or adjusted under 35 U.S.C. 154(b) by 840 days.

(21) Appl. No.: 12/010,093

(22) Filed: Jan. 18, 2008

(65) Prior Publication Data

US 2008/0183986 A1 Jul. 31, 2008

(30) Foreign Application Priority Data

Jan. 26, 2007 (GB) .................................. 0701556.3

(51) Int. Cl.
*G06F 12/00* (2006.01)
*G06F 13/00* (2006.01)
*G06F 13/28* (2006.01)
*G06F 12/08* (2006.01)
*G06F 9/26* (2006.01)
*G06F 9/34* (2006.01)
*G06F 9/30* (2006.01)
*G06F 9/40* (2006.01)
*G06F 7/38* (2006.01)
*G06F 9/00* (2006.01)
*G06F 9/44* (2006.01)

(52) U.S. Cl. ............ 711/159; 711/3; 711/100; 711/117; 711/118; 711/133; 711/134; 711/136; 711/137; 711/204; 711/205; 711/213; 711/216; 711/206; 711/207; 711/135; 712/207; 712/237

(58) Field of Classification Search ................... 711/159
See application file for complete search history.

(56) References Cited

U.S. PATENT DOCUMENTS

| | | | |
|---|---|---|---|
| 6,003,115 A | 12/1999 | Spear et al. | |
| 6,070,009 A * | 5/2000 | Dean et al. | ..................... 717/130 |
| 6,418,510 B1 | 7/2002 | Lamberts | |
| 6,487,639 B1 * | 11/2002 | Lipasti | ........................... 711/137 |
| 6,499,116 B1 * | 12/2002 | Roth et al. | ........................ 714/39 |
| 6,560,693 B1 * | 5/2003 | Puzak et al. | ................... 712/207 |
| 7,039,760 B2 * | 5/2006 | Arimilli et al. | ................ 711/118 |

(Continued)

FOREIGN PATENT DOCUMENTS

JP 7028706 1/1995

OTHER PUBLICATIONS

European Search Report dated Apr. 5, 2007.

(Continued)

*Primary Examiner* — Sanjiv Shah
*Assistant Examiner* — Marwan Ayash
(74) *Attorney, Agent, or Firm* — Nixon & Vanderhye P.C.

(57) ABSTRACT

A data processing system includes a data store having storage locations storing entries which can be used for a variety of purposes, such as operand value prediction, branch prediction, etc. An entry profile store stores profile data for more candidate entries than there are storage locations within the data store. The profile data is used to determine replacement policy for entries within the data store. The profile data can include hash values used to determine whether predictions associated with candidate entries were correct without having to store the full predictions within the profile data.

19 Claims, 4 Drawing Sheets

U.S. PATENT DOCUMENTS

| | | | |
|---|---|---|---|
| 7,089,396 B2* | 8/2006 | Bottemiller et al. | 711/207 |
| 7,539,679 B2* | 5/2009 | Suganuma et al. | 1/1 |
| 2002/0053006 A1 | 5/2002 | Kawamoto et al. | |
| 2003/0236949 A1 | 12/2003 | Henry et al. | |

OTHER PUBLICATIONS

Eickemeyer et al.: "A load-instruction unit for pipelined processors," IBM J. Res. Develop., vol. 37, No. 4, Jul. 1993, pp. 547-564.

Calder et al.: "Selective Value Prediction," IEEE, 1999, pp. 64-74.

Kharbutli et al.: "Counter-Based Cache Replacement Algorithms," To appear in the Proceedings of the International Conference on Computer Design, San Jose, CA, Oct. 2005, pp. 1-9.

Kampe et al.: "Self-Correcting LRU Replacement Policies," *CF'04*, Apr. 2004, Italy, pp. 181-191.

Rosner et al.: "Filtering Techniques to Improve Trace-Cache Efficiency," Microprocessor Research Lab, Israel Design Cetner, Intel Corporation, 12 pages.

* cited by examiner

ENTRY REPLACEMENT WITHIN A DATA STORE USING ENTRY PROFILE DATA AND RUNTIME PERFORMANCE GAIN DATA

This application claims priority to UK Application No. 0701556.3 filed Jan. 26, 2007, the entire contents of which is hereby incorporated by reference.

TECHNICAL FIELD

This technical field relates to the field of data processing systems. More particularly, the technology described in this application relates to data processing systems including a data store having a plurality of storage locations and a replacement mechanism for controlling which data entries within respective storage locations of the data store are replaced with candidate entries during operation.

BACKGROUND

It is known within the field of data processing systems to provide data stores with entries which are replaced under control of a replacement mechanism during ongoing operation. Such data stores are commonly, although not exclusively, used to predict data with the aim of increasing processing speed and exploiting higher degrees of instruction level parallelism. As an example, value predictors and branch predictors are known which keep a history of previous instructions in order to predict the data or outcome of an upcoming instruction. Such mechanisms can be highly successful in increasing performance.

A significant disadvantage associated with such known prediction mechanisms is that they have large overhead in terms of the circuit area and power which they consume. Typically, in order to be effective at providing a high degree of prediction, such mechanisms need to store a large numbers of entries. However, in practice only a subset of these entries are useful and a large number of the entries contain non-useful data. Examples of such non-useful data are non-regular (unpredictable) entries in a value predictor or branches that have non-regular behaviour or happen very rarely in a branch predictor. However, if one attempts to reduce the number of entries within such structures in order to reduce their associated overhead, there is a significant degradation in the prediction accuracy. As an example, using smaller structures with fewer entries will normally have the effect that useful entries will be evicted by different non-useful entries rendering the predictor less effective.

Known prior techniques seeking to address the above problems mainly focus on replacement policies that decide which entry in a predictor table will be replaced based upon its performance using event counters [2, 3] or hysteresis counters. Event counters keep track of the performance of each entry based upon different events such as miss or hit. Hysteresis counters provide for a delay in the replacement of an entry so as to avoid premature replacement. There are also various known techniques [4, 5] to filter the instructions that update the predictors. Such filtering reduces the pressure on entry capacity due to excessive replacements and improves the prediction accuracy. In addition, confidence history may be used in order to avoid replacing entries that deliver good predictions by others that have poor prediction accuracy. Nevertheless, these methods rely on having large storage capacities within the data stores to achieve accurate predictions. With smaller data stores it is impractical to use, for example, hysteresis counters since there is not enough time when the entries are present in the data store to get hits which increase the counter numbers to meaningful levels.

SUMMARY

Viewed from one aspect, an apparatus for processing data comprises:
a data store having a plurality of storage locations;
an entry profile store of profile data for candidate entries to be stored in storage locations of said data store, said entry profile store serving to store profile data in respect of for more candidate entries than there are storage locations within said data store; and
an entry replacer responsive to said profile data stored in said entry profile store for at least a candidate entry and an existing entry to control whether said candidate entry replaces said existing entry within a storage location of said data store; wherein
said profile data includes performance gain data indicative of performance gains associated with use of respective candidate entries stored within said data store and said entry replacer preferentially stores candidate entries with a high associated performance gain when stored within said data store; further comprising
a profile data updater to update said performance gain data in dependence upon cycle counts associated with actual use of a candidate entry when not stored within said data store, and to update said performance gain data in dependence upon cycle counts associated with actual use of a candidate entry when stored within said data store.

The above technique of using a data store in combination with an entry profile store facilitates a more efficient use of the storage capacity of the data store. The entry profile store can be used to build up accurate profile data for candidate entries which are potentially to be stored within the data store, and then this accurate (but relatively compact) profile data is used to decide which candidate entries will or will not be stored within the limited resources of the data store. This combination provides the ability to gain a performance roughly comparable with a full size data store and yet in practice use a much smaller data store with the entry profile store being employed to make efficient use of the limited resources of the data store. Furthermore, the smaller data store will generally be simpler and faster than a larger structure. This can help reduce the critical path in many circumstances. The entry profile store and profile data may be used to achieve filtering and confidence measures for unpredictable instructions by keeping track of the performance gain associated with those unpredictable instructions. The profile data includes performance gain data indicative of performance gains associated with use of respective candidate entries stored within the data store such that the entry replacer preferentially stores candidate entries with a higher associated performance gain. Such performance gain data can be updated dynamically with a profile data updater in dependence upon cycle counts associated with the actual use of a candidate entry when it is not stored within the data store, e.g. when an entry is not stored the count of the number of stalled cycles which result can be used as a performance gain indicator indicative of cycles which would be saved if the entry had been stored and the stall had been avoided.

It will be appreciated that the data store could take a wide variety of different forms. One example is a translation lookaside buffer indexed with data addresses wherein the entries are address mapping data.

Another example are a class of data stores in which indexing is performed with program instruction addresses. Such data stores include branch target instruction caches, in which the storage locations store branch target instructions, and branch target buffers in which the storage locations store next addresses of instructions that are to be fetched. The data store can more generally provide a prediction memory for storing prediction data. One example of such a prediction memory is an operand value predictor in which the storage locations store predictions of operand values associated with program instructions at respective instruction addresses.

Within the context of an operand value predictor, a stride value predictor may be used in combination therewith such that a prediction of a stride value can be associated with operand values which change upon each use in a predictable manner.

Further examples of profile data which may be stored include frequency data indicative of how often respective candidate entries are used with the entry replacer preferentially storing candidate entries with a higher frequency of reuse. The profile data updater can update such frequency data dynamically in use.

Another example of profile data is confidence data indicative of the probabilities of predictions made in dependence upon storing respective candidate entries being correct with the entry replacer preferentially storing candidate entries with a higher probability of resulting in a correct prediction.

In order to reduce the amount of profile data needing to be stored within the entry profile store when using such confidence data as profile data, the profile data can include predicted hash functions indicative of predicted outcomes that would result from storing respective candidate entries within the data store. These predicted hashed functions can then be compared with hash functions generated in dependence upon actual processing to generate a result for use in a comparison to indicate whether or not a prediction associated with a candidate entry within the entry profile data was or was not correct.

The generation of hash values and prediction updating in general can conveniently be performed within a pipelined processing system at the writeback stage.

In order to facilitate the replacement of entries within the data store in circumstances where previous behaviour is unlikely to continue (e.g. a context switch, or a change to a different loop within the same program, when previously highly accurate predictions are unlikely to continue to be accurate) the profile data can include context data indicative of respective contexts in which candidate entries were last used with the profile data updating circuitry changing a context value being associated with profile data being updated when an invalid profile data entry or a profile data entry with a different context value is updated. In this way, data entries associated with out-of-date context(s) can be readily identified and preferentially replaced since it is unlikely that they will continue to return good results from their presence within the data store.

The data store may be formed in a variety of different ways. These include a directly mapped data store or fully associative data store. Both have advantages in particular circumstances which render them more suitable in those circumstances.

Viewed from one aspect, a method of processing data comprises the steps of:

storing entries within a data store having a plurality of storage locations;

within an entry profile store, storing profile data in respect of candidate entries to be stored in storage locations of said data store, said entry profile store serving to store profile data in respect of more candidate entries than there are storage locations within said data store; and in response to said profile data stored in said entry profile store in respect of at least a candidate entry and an existing entry, controlling whether said candidate entry replaces said existing entry within a storage location of said data store; wherein said profile data includes performance gain data indicative of performance gains associated with use of respective candidate entries stored within said data store and said controlling preferentially stores candidate entries with a high associated performance gain when stored within said data store; and further comprising updating said performance gain data in dependence upon cycle counts associated with actual use of a candidate entry when not stored within said data store; and updating said performance gain data in dependence upon cycle counts associated with actual use of a candidate entry when stored within said data store.

Viewed from a further aspect the technology described in this application provides an apparatus for processing data comprising:

data store means having a plurality of storage location means;

entry profile store means for storing profile data in respect of candidate entries to be stored in storage location means of said data store means, said entry profile store means serving to store profile data in respect of more candidate entries than there are storage location means within said data store means; and entry replacer means responsive to said profile data stored in said entry profile store in respect of at least a candidate entry and an existing entry for controlling whether said candidate entry replaces said existing entry within a storage location means of said data store means; wherein said profile data includes performance gain data indicative of performance gains associated with use of respective candidate entries stored within said data store and said controlling preferentially stores candidate entries with a high associated performance gain when stored within said data store; further comprising a profile updating means for updating said performance gain data in dependence upon cycle counts associated with actual use of a candidate entry when not stored within said data store; and for updating said performance gain data in dependence upon cycle counts associated with actual use of a candidate entry when stored within said data store.

The above, and other objects, features and advantages will be apparent from the following detailed description of illustrative embodiments which is to be read in connection with the accompanying drawings.

DESCRIPTION OF EXAMPLE EMBODIMENTS

Figure 1:
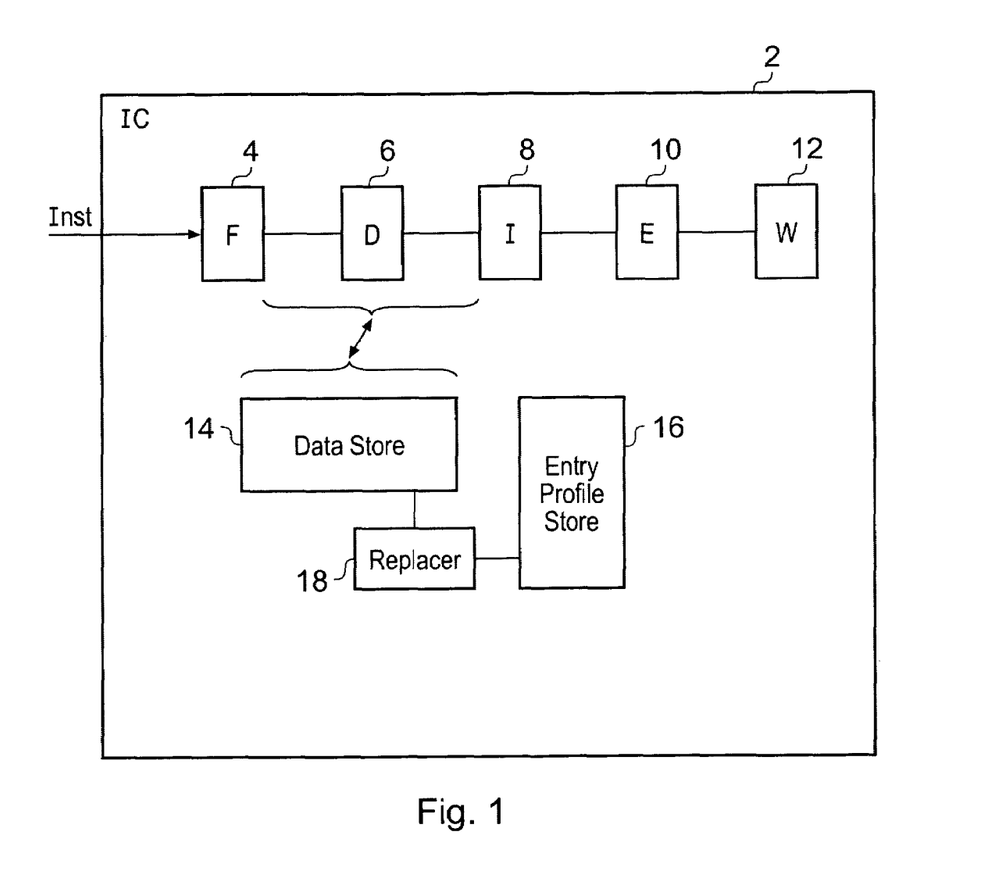
FIG. 1 schematically illustrates an integrated circuit incorporating a data store with an associated entry profile store.

FIG. 1 schematically illustrates an integrated circuit 2 executing program instructions using an instruction pipeline comprising fetch, decode, issue, execute and writeback stages 4, 6, 8, 10, 12. Such an instruction pipeline will be familiar to those in this technical field. A processor including such an instruction pipeline 4, 6, 8, 10, 12 will typically include many other elements (e.g. register bank, ALU, etc), but these will be familiar to those in this field and have not been shown in FIG. 1.

Associated with the instruction pipeline 4, 6, 8, 10, 12 is a data store 14 having storage locations storing entries used to predict data, instructions, or other information required by the instruction pipeline 4, 6, 8, 10, 12. The data store 14 is kept to a relatively small size having relatively few entries compared to conventional predictors and similar structures. Associated with the data store 14 is an entry profile store 16 which stores profile data in respect of candidate entries which can be stored within the storage locations of the data store 14. The entry profile store 16 stores profile data in respect of a larger number of candidate entries than there are storage locations within the data store 14. The amount of data stored for each candidate entry within the entry profile store 16 is relatively small compared to the data stored for an entry within the data store 14. Accordingly, the entry profile store 16 can store profile data in respect of a large number of candidate entries and use this to accurately deploy the storage resources of the data store 14 such that the entries stored within the finite storage locations therein are deployed to good advantage. Entry replacer circuitry 18 associated with the data store 14 and the entry profile store 16 controls the replacement of entries within the data store 14 with candidate alternative entries in dependence upon the profile data stored within the entry profile store 16 for at least the candidate new entries (and in some embodiments also the existing entries). The entry replacer circuitry 18, also functions to update the profile data and entries in the data store 14 and so additionally serves as profile data updating circuitry.

It will be appreciated that the data store 14 and its interaction with the instruction pipeline 4, 6, 8, 10, 12 could take a wide variety of different forms. The data store 14 could be a translation lookaside buffer indexed with data addresses with entries within the data store 14 being address mapping data. Another class of possibilities are where the data store is indexed with program instruction addresses to provide access to entries stored therein. Examples of such arrangements are where the data store is part of a branch target instruction cache and the storage locations within the data store 14 store branch target instructions associated with branch instructions detected within the instruction pipeline 4, 6, 8, 10, 12 from their instruction addresses. A further example form of the data store 14 is as part of a branch target buffer with the storage locations storing next addresses of instructions following branch instructions detected using instruction addresses as these instructions are fetched.

Another view of the data store 14 is that it can generally be used as a prediction memory (i.e. encompassing at least some of the above uses) with the storage locations storing prediction data. One particular form of prediction memory in which the present technique can have high utility is where the data store forms part of an operand value predictor and the storage locations store predictions of operand values associated with program instructions at respective instruction addresses. Operand value predictors themselves are known in the field of high performance processors. Operand predictors rely upon the statistical likelihood that an operand fetched for an instruction taken from a particular memory address on the last occasion that instruction was executed is likely to be fetched again with the same value on the next occurrence of that instruction, or with a value correlated with the previous value (e.g. related by a predictable stride value or the like). The principles of operation of an operand value predictor and the utility of such will be familiar to those in this technical field and will not be described further herein. However, one characteristic of operand predictors which the present technique helps to improve concerns the overhead associated with the provision of effective operand predictors. Traditional operand predictors require large amounts of data storage capacity in order to be able to effectively predict operands for a useful number of program instructions encountered. This necessitates storing many entries which are in practice not useful and thus wastes resources. The present technique allows the entry profile store to store profile data associated with a large number of operand prediction entries and use this profile data to appropriately and efficiently deploy the storage resources of the data store 14 to store operand predictions for entries with an increased likelihood of usefulness. This allows an operand value predictor structured in accordance with the present techniques to achieve prediction performance approaching that of a full size operand value predictor but with a reduced circuit overhead.

It will be appreciated that the profile data stored within the entry profile store 16 can take a wide variety of different forms. A role of this profile data is to enable the entry replacer circuitry 18 to determine which candidate entries should be stored within the storage locations of the data store 14. Different types of profile data and/or combinations of profile data may be better suited to certain uses than others. An example of the type of profile data which may be stored within the entry profile store 16 is performance gain data indicative of performance gains associated with use of respective candidate entries that can be stored within the data store 14. The entry replacer circuitry 18 and the entry profile store 16 are responsive to the behaviour of the instruction pipeline 4, 6, 8-10, 12, both when a candidate-entry is not stored within the data store 14 and when it is so stored, to determine the performance difference between the system when that entry is stored and when it is not stored. When an entry is not stored within the data store 14, a stall is likely in order that an operand fetch can occur, a branch resolved etc, and the number of cycles for which this stall lasts can be determined. This number of stalls would likely be avoided if that candidate data entry were present within the data store 14 rather than not being present. It will be appreciated that when this information is available the storage location resources of the data store 14 can be deployed by the entry replacer circuit 18 so as to be targeted at those candidate entries which are associated with the largest performance gains when those entries are present within the data store 14. Generally speaking an entry with a higher associated performance gain will be preferentially stored compared to an entry with a lower associated performance gain. Accordingly, the entry replacer circuitry 18, when a miss occurs within the data store 14 for a candidate entry, compares the performance gain data stored within the entry profile store 16 for that candidate entry with performance gain data associated with entries already present within the data store 14 and when the candidate entry has a suitably higher associated performance gain initiates a replacement such that a selected entry within the data store 14 is evicted and replaced with the candidate entry upon which a miss has occurred and with which a high performance gain is associated as indicated by the profile data.

Another example of the type of profile data which can be stored within the entry profile store 16 is frequency data indicative of how frequently respective candidate entries are used (encountered). In this example of an operand value predictor, certain operands may be required by instructions which are executed frequently. Generally speaking avoiding stalls by allowing operand value prediction to be performed in respect of instructions which are encountered frequently will be more beneficial than avoiding stalls for instructions which are encountered less frequently. Thus, the entry replacer circuitry 18 is responsive to profile data (and maintains that profile data) which indicates how frequently certain program instructions and their associated entries are encountered such that candidate entries with a high frequency of use are preferentially stored within the data store 14.

It will be appreciated that a combination of different types of profile information for entries may be maintained within the profile data of the entry profile store 16. As an example, both performance gain data and frequency data may be maintained. Thus, the entry replacer circuitry 18 can determine from a combination of the performance gain data and the frequency data which would be the most effective entry to store within the data store 14. Thus, an entry associated with a small performance gain but with a high frequency may be preferentially stored compared to an entry with a high performance gain but that was encountered very infrequently. The entry replacer circuitry 18 can implement simple algorithms calculating functions based upon the profile data within the entry profile store 16 to determine replacement policy in respect of the storage locations within the data store 14 so as to effectively manage the deployment of those storage locations where they will achieve improved performance gains.

A further example of profile data which may be stored is confidence data indicative of the probability of a prediction associated with an entry being correct. Thus, while an entry may have a high frequency of occurrence and a high performance penalty if not stored, but be an entry with a low probability of being accurate and accordingly avoiding the associated stall. In these circumstances, the confidence data can be used to suppress storage of that entry within the data store 14 in circumstances where it might otherwise be indicated as desirable by the frequency data and/or the performance gain data alone.

In order to maintain confidence data efficiently without imposing an undue storage burden upon the entry profile store 16, the present techniques use hashing functions. It will be appreciated that if the entry profile store 16 had to store the predicted outcomes to determine whether or not those actually occurred when the entry is not stored within the data store 14, then the size of the entry within the entry profile store 16 would start to approach that within the data store 14 and the advantage of the present technique would be significantly diminished, if not lost completely. Thus, the present technique proposes including within the profile data predicted hash function values derived from the predicted outcomes associated with candidate entries that would result from storing those candidate entries within the data store 14. These hash function values can then be compared with corresponding hash function values derived when the actual execution is performed to determine whether or not the prediction which would have been made would have been a correct prediction. This can be used to update and maintain the confidence data within the entry profile store 16 without having to store full predicted values therein. It will be appreciated that whilst a hash function value may not definitively represent a predicted outcome, it nevertheless has a high degree of correlation therewith which is sufficient to gain an accurate indication of whether or not the predicted outcome would have been correct and that can be used to maintain a good quality confidence value with a reduced storage overhead. The hashed value for the actual result can be generated at the write access stage 12 within the instruction pipeline and used to update the confidence data within the entry profile store 16 under control of the entry replacer circuitry 18.

Another significant factor which can influence the usefulness of entry stored within the data store 14 is whether or not they relate to a current context within which the processor 2 is operating. Thus, while a set of entries may be generated in a manner appropriate to a particular processing context, a program context switch, or other context switch, such as a change to a different loop within the same program, may occur which has the result that those entries are ineffective in the new context. If measures of frequency, performance gain, confidence etc were used alone then this might prevent, or at least undesirably slow, the replacement of those existing entries within the data store with new entries more appropriate to the new context. For this reason, the profile data may in some circumstances be arranged to include program context data indicative of the context in which a candidate entry was last used with the profile data updating circuitry changing the context value it is associating with the profile data when an invalid profile data entry or a profile data entry with a different context value is to be updated. Thus, changes in context can be indicated by the way in which the entries within the data store 14 and the entry profile store 16 are found to be related to the actual processing outcomes and this detection of a context change can then be used to update the current context value being applied in a manner which enables the current context to be tracked and the replacement policy adapted thereto.

The data store 14 itself can be arranged in a number of different ways. In some circumstances a fully associative data store 14 may be appropriate whereas in other circumstances a direct mapped data store 14 may be better suited to giving better performance.

It will be appreciated that in the above context the entry replacer circuitry 18 has been associated with the role of applying the entry replacement policy to the data store 14 to determine which existing entries are evicted by which candidate entries. The entry replacer circuitry 18 can also perform the role of updating the profile data within the entry profile store 16 and accordingly perform the role of a profile data updater. It will be appreciated that these roles may however be separated and that the circuitry performing these roles could be separately located. The circuitry itself can take a wide variety of different forms as will be appreciated by those in this technical field.

Figure 2:
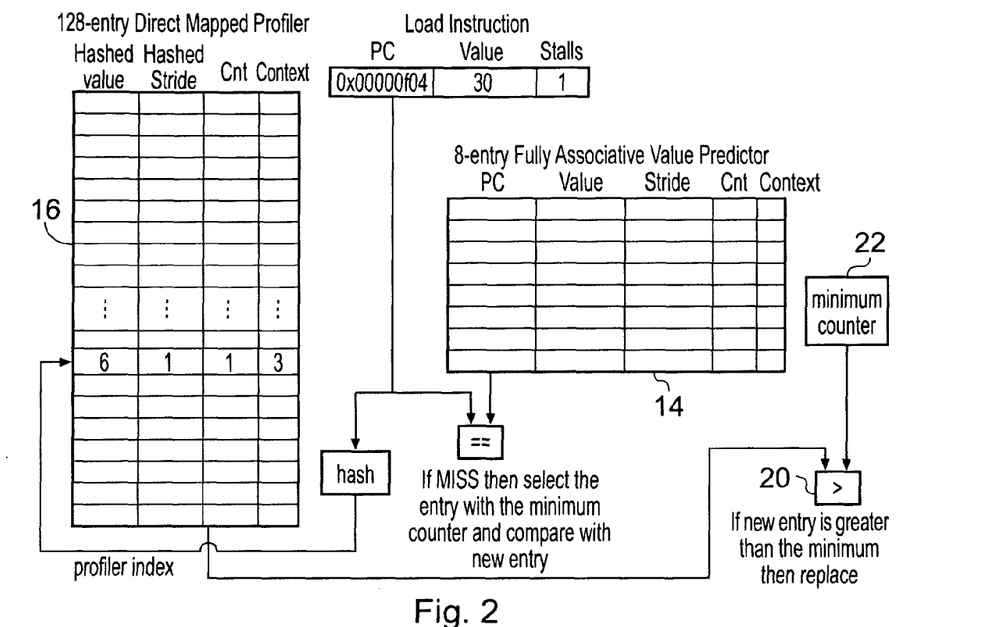
FIG. 2 illustrates a value predictor with an 8-entry fully associative data store and a 128-entry direct mapped entry profile store.

FIG. 2 illustrates a 128-entry direct mapped entry profile store 16 and an 8-entry fully associative data store 14 serving as an operand value predictor. The fields stored as profile data within the entry profile store 16 are as follows:

Hash value: Hash value is the last 3 bits of the loaded value plus the sign of the value. The hashed value with the hashed stride will predict if an instruction trying to enter the value predictor is predictable or not. This is done by comparing the hashed value plus the hashed stride with the hash of the correct loaded value at the writeback stage.

Hash stride: Hash stride is the last 3-bits plus the sign of the difference between the old hashed value and the new hashed value.

Counter: The counter is set to the number cycles for which the processor stalls if the hashed delta plus the hashed stride are equal to the hash of the new loaded value. This means that this load instruction is possibly predictable. Otherwise the counter is decremented by one if it's greater than zero.

Context: The context number is a unique number assigned heuristically to all loads that belong to the same contexts. Most of the times, a context refers to a specific inner loop.

Detecting context: Initially current context (Ccontext) is set to 1, and all entries of the profiler are invalid. When adding a new entry to the profiler, it is assumed that the system is in Ccontext=1 as long as it is adding new entries in the profiler and this context is assigned to all subsequent invalid entries. Now, if a valid entry whose context is equal to the current context (Ccontext=1) is encountered then it is assumed that the system is in the loop corresponding to the current context. This current context is maintained until a new invalid entry or an entry with a different context is encountered. At this point a newly generated context number is assigned to these entries.

The use of hashed values along with the counter allows the profiler to approximately but accurately calculate how much an instruction will contribute to the performance. For example, each time a load instruction reaches the writeback stage it tries to update the profiler. The hashed value plus the hashed stride are compared with the hash of the loaded value and if they are equal then the counter is updated with the number of stalls that the load caused. Otherwise, if the hashed information does not match, then the counter is decremented by one if it's greater than zero. The profiler is updated with the new hashed value and hashed stride.

Furthermore, filtering techniques, such as updating the value predictor only with load instructions, and only those that caused a stall, may also be used.

The behaviour of the value predictor during the prediction and recovery phase is comparable to the simple stride value predictor described in reference [1]. The present profiler is active at the writeback stage when the value predictor is updated. Specifically, (a) if an entry corresponding to the load instruction is already in the value predictor, then the profiler (entry profile store 16) and the predictor (data store 14) are updated, and (b) if an entry corresponding to the load instruction is not in the value predictor then only the profiler is updated. The profiler also decides whether and which entry in the value predictor should be replaced.

More detailed steps of an example dynamic profile based replacement policy are explained below. As stated before, the following takes place at the writeback stage when the loaded value is available and the predictor is to be updated:
(a) An entry corresponding to the load instruction is already in the value predictor
1. Index the profiler with the load instruction's PC and update the corresponding entry
a. If the value plus the stride in the value predictor is equal to the loaded value then the counter is set to the number of stalls this load instruction caused
b. Else the counter is decremented by one
c. Update the profiler with the new hashed value and new hashed stride
2. Update the entry of the value predictor with the new value, stride, counter and context
(b) An entry corresponding to the load instruction is not in the value predictor
1) Index the profiler with the load instruction's PC and update the corresponding entry
a. If the hashed value plus the hashed stride in the profiler is equal to the hash of the loaded value then the counter is set to the number of stalls caused by the load.
b. Else the counter is decremented by one
c. Update the profiler with the new hashed value and new hashed stride
d. Set the context of the entry to the current context
2) Access the value predictor and find a candidate entry for replacement
a. If one or more entries in the value predictor do not belong to the current context, then from those entries, the entry with the minimum counter will be selected (A low value in the counter indicates that the load cause few stall cycles, thus has little impact on performance, or is hardly predictable).
b. Else if all the entries in the value predictor belong to the current context then the entry with the minimum counter will be selected
3) Compare the counter and context of the candidate entry for replacement with the counter and context of the new load instruction
a. If the candidate entry belongs to a different context than the current context then replace the entry with the new load instruction
b. Else if the candidate belongs to the current context but has a smaller counter than the counter of the new load instruction, then replace the entry with the new load instruction
c. Else if the candidate entry for replacement belongs to the current context and has also bigger counter than the new load instruction then do nothing Returning to FIG. 2 it will be seen that when a miss occurs a comparator 20 is used to compare a count value stored within the profile data with a minimum count value of any of the currently stored entries within the data store 14 and, if the candidate entry has a count value higher than the minimum count value of any of the entries within the data store 14, then that data entry within the data store 14 is replaced with the candidate entry. As the count values within the data store 14 are updated as described above, a minimum counter 22 can be updated so as to keep track of the minimum value of any of the data entries stored within the data store 14 without having to make a full lookup of those entries each time when the comparator 20 needs to make its determination regarding replacement.

Figure 3:
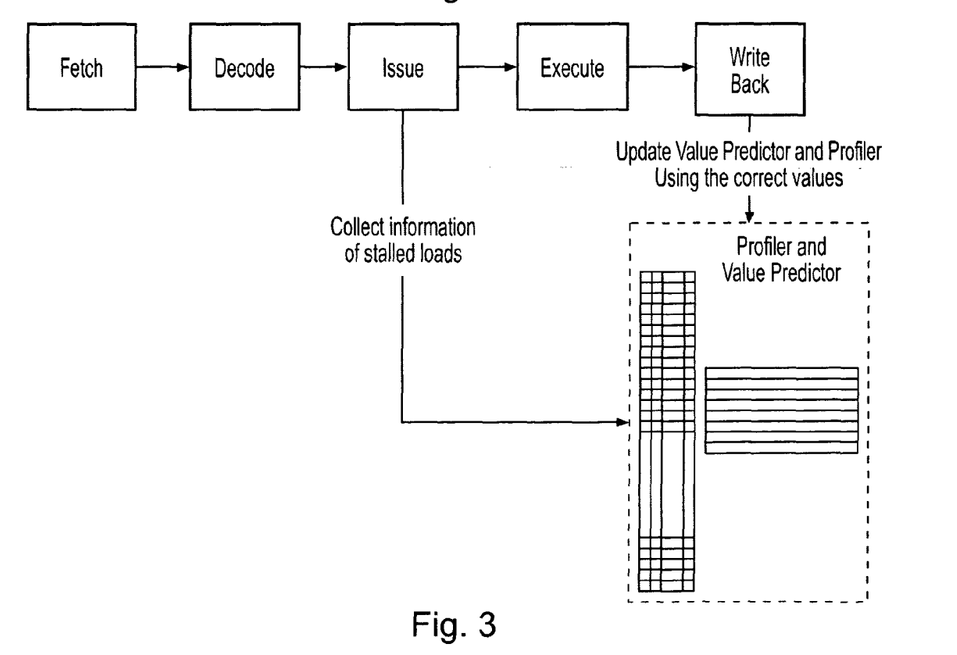
FIG. 3 illustrates the relationship of a value predictor to an instruction pipeline which may be used in a physical circuit or as part of a simulation model.

FIG. 3 schematically illustrates a five stage pipeline which can be used in reality or as a model to compare the behaviour of the value predictor using the current techniques with a full size value predictor. FIG. 3 shows that on issue stage the systems collect the information concerning how many stalls a certain load caused and whether at the writeback stage the system has the correct loaded value. The predictor compares the predicted value with the correct value and determines if it was possible to avoid those stalls. For the purpose of modelling, changes to the execution are not made but the value predictor is updated following the trace and detects any correct or wrong predictions.

Figure 4:
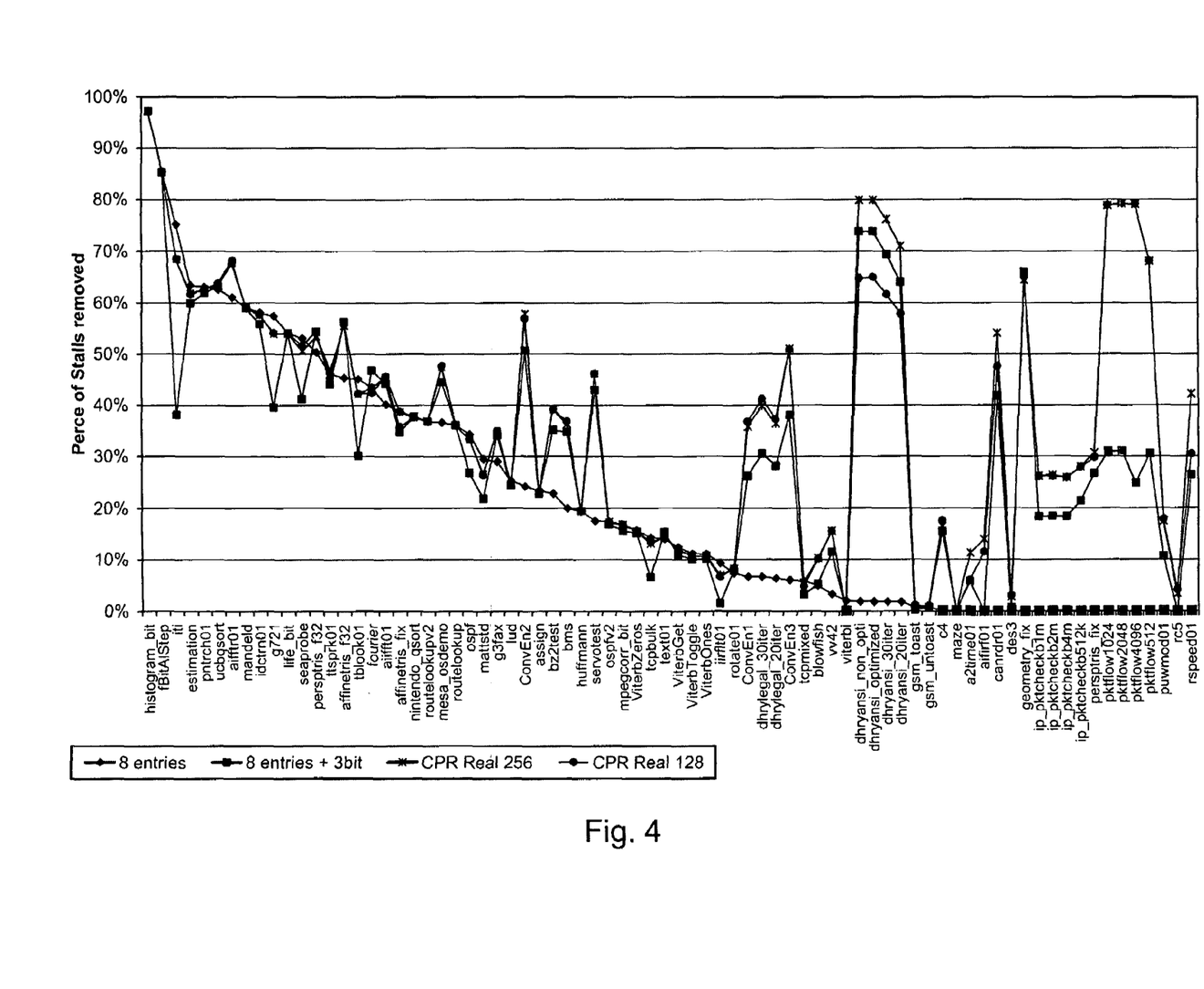
FIG. 4 illustrates simulation results relating to the percentage of stalls removed when using a value predictor of various forms.

The performance metric of the modelling discussed below is the percentage of stalls successfully removed, on correct predictions, over all stalls caused by load instructions. FIG. 4 shows the results using the percentage of stalls successfully removed and correctly predicted, from all the stalls caused during execution. The line "8 entries" correspond to an 8-entry fully associative value predictor using LRU, the line "8 entries+3 bit" correspond to an 8-entry fully associative value predictor using LRU plus a 3-bit counter for each entry to provide hysteresis during replacement. For the "8 entries+3 bit" experiments, the counter is set to maximum when a new entry is inserted or the entry gives a correct prediction, and the counter is decremented by one when the entry gives a wrong predictions or the entry is the LRU and that entry was candidate for replacement. An entry cannot be replaced if the counter is not zero. Finally the "CPR Real 128" and "CPR Real 256" correspond to an 8-entry value predictor with the proposed dynamic profiler, of 128 and 256 entries respectively, used as a replacement policy as described in the previous section.

The results indicate that the potential performance improvement is significant when compared to the LRU policy (17% more stalls removed) but less compared to the LRU+3 bit hysteresis counters (6% more stalls removed). An important observation from FIG. 3 is that the new replacement policy can almost always remove more or equal stalls compared with the other policies. For example, in 500 iti benchmark on the graph (third one), the "8 entries+3 bit" is doing much worse than the simple "8 entries" scheme while the profiler technique can achieve close or better performance.

It will be apparent that many alternatives to the above specific example are possible using the present technique.

Detecting context: An alternative way to assign the context number to each instruction is to do it using the compiler. The compiler can detect instructions that belong to the same context and assign to each instructions that belongs to the same context a unique number. Another way to assign the context can be using the branch predictor history. History bits can index a direct mapped table and provide a current context unique number.

Application: Although in the above uses the dynamic profiler as a replacement policy for a value predictor, it can be applied as a replacement policy for a BTB, a BTIC or other data structures with high pressure upon storage resources. In these cases, the hashed information and function using that information is adapted to provide the performance of each instruction.

Figure 5:
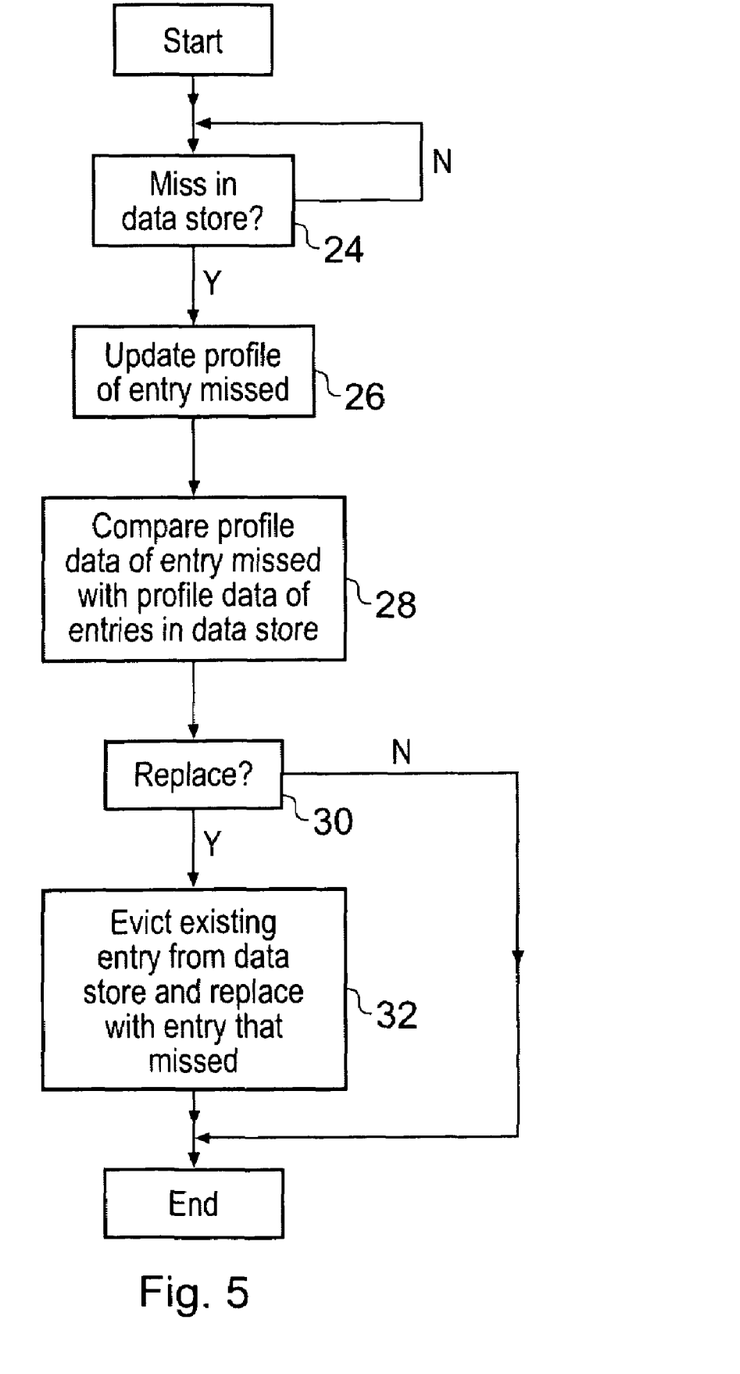
FIG. 5 is a flow diagram schematically illustrating the control of replacement of entries within a data store using entry profile data.

FIG. 5 is a flow diagram schematically illustrating entry replacement processing. At step 24 the system waits for a miss to occur within the data store 14. At step 26 the profile data for the entry missed is updated. The updating of the profile data can also be performed as an on-going process when hits occur so as to build accurate profile data representing the behaviour of the system. At step 28 the profile data for the entry missed is compared with the profile data of the entries in the data store 14 to determine whether or not it would be more effective to store the missed entry within the data store 14 than one of the current entries within the data store 14. This can be by comparison of the counter value previously discussed, which is taken to be a compound measure of the effectiveness of a particular entry. At step 30, a determination is made as to whether or not replacement is to be performed. If replacement is to be performed, then processing proceeds to step 32 at which an existing entry is evicted from the data store 14 and is replaced with the entry that missed and which has been determined to have a higher efficacy when stored within the data store 14. The processing then ends.

Whilst the above has been described in terms of special purpose hardware, it will be appreciated that the present techniques could be embodied in the form of appropriately programmed genera purpose hardware.

Although illustrative embodiments have been described in detail herein with reference to the accompanying drawings, it is to be understood that the claims are not limited to those embodiments, and that various changes and modifications can be effected therein by one skilled in the art without departing from the scope and spirit of the appended claims.

REFERENCES

[1] R. J. Eickemeyer and S. Vassiliadis, "A load instruction unit for pipelined processors",
IBM Journal of Research and Development July 1993
[2] Mazen Kharbutli and Yan Solihin, "Counter-Based Cache Replacement Algorithms",
In ICCD 2005
[3] Martin Kampe, Per Stenstrom and Michel Dubois, "Self-Correcting LRU Replacement Policies", 1st conference on Computing frontiers
[4] Roni Rosner, Avi Mendelson and Ronny Ronen, "Filtering Techniques To Improve Trace Cache Efficiency", In PACT 2001
[5] Brad Calder, Glenn Reinman and Dean M. Tullesen, "Selective Value Prediction", In ISCA99

The invention claimed is:

1. Apparatus for processing data comprising:
a data store having a plurality of storage locations;
an entry profile store of profile data for candidate entries to be stored in storage locations of said data store, said entry profile store serving to store profile data for more candidate entries than there are storage locations within said data store; and
an entry replacer, configured to compare, in response to a miss in said data store, said profile data stored in said entry profile store for at least a candidate entry and an existing entry, the comparison being triggered by a miss in said data store, and to control whether said candidate entry replaces said existing entry within a storage location of said data store in dependence on the comparison; wherein
said profile data includes performance gain data indicative of performance gains associated with use of respective candidate entries stored within said data store and said entry replacer preferentially stores candidate entries with a high associated performance gain when stored within said data store; further comprising
a profile data updater to update said performance gain data in dependence upon cycle counts associated with actual use of a candidate entry when not stored within said data store, and to update said performance gain data in dependence upon cycle counts associated with actual use of a candidate entry when stored within said data store,
wherein said profile data includes confidence data indicative of probabilities of predictions made in dependence upon storing respective candidate entries within said data store being correct and said entry replacer is configured to preferentially store candidate entries with a high probability of resulting in a correct prediction when stored within said data store.

2. Apparatus as claimed in claim 1, wherein said data store is a translation lookaside buffer indexed with data addresses and said entries are address mapping data.

3. Apparatus as claimed in claim 1, wherein said data store is indexed with program instruction addresses to provide access to entries stored therein.

4. Apparatus as claimed in claim 2, wherein said data store is part of a branch target instruction cache and said storage locations store branch target instructions associated with branch instructions at respective instruction addresses.

5. Apparatus as claimed in claim 2, wherein said data store is part of a branch target buffer and said storage locations store next addresses of instructions following branch instructions at respective instruction addresses.

6. Apparatus as claimed in claim 1, wherein said data store is a prediction memory and said storage locations store prediction data.

7. Apparatus as claimed in claim 6, wherein said prediction memory is part of an operand value predictor and said storage locations store predictions of operand values associated with program instructions at respective instruction addresses.

8. Apparatus as claimed in claim 7, wherein said operand value predictor is a stride value predictor and said storage locations store respective predictions of stride values by which associated operand values change upon each use.

9. Apparatus as claimed in claim 1, wherein said profile data includes frequency data indicative of how frequently respective candidate entries are used and said entry replacer preferentially stores candidate entries with a high frequency of use within said data store.

10. Apparatus as claimed in claim 9, wherein profile data updater updates said frequency data in dependence upon actual use of a candidate entry.

11. Apparatus as claimed in claim 1, wherein said profile data includes predicted hash functions indicative of predicted outcomes that would result from storing respective candidate entries within said data store.

12. Apparatus as claimed in claim 11, wherein a profile data updater compares a predicted hash function stored within said profile data for a candidate entry with a corresponding actual hash function generated in dependence upon processing associated with said candidate entry to generate a result indicate of whether or not a prediction associated with said candidate entry being stored in said data store was correct.

13. Apparatus as claimed in claim 12, wherein said apparatus includes an instruction processing pipeline having a writeback stage and said actual hash value is generated in said writeback stage.

14. Apparatus as claimed in claim 1, wherein said profile data includes program context data indicative of respective contexts in which candidate entries were last used and profile data updating circuitry changes a context value being associated with profile data being updated when an invalid profile data entry or a profile data entry with a different context value is to be updated.

15. Apparatus as claimed in claim 14, wherein said entry replacer preferentially replaces entries within said data store having profile data having a context value different to a current context value.

16. Apparatus as claimed in claim 1, wherein said data store is fully associative such that a candidate entry may be stored within any of said storage locations.

17. Apparatus as claimed in claim 1, wherein said entry profile store is directly mapped such that profile data for a candidate entry may only be stored in one location.

18. A method of processing data comprising the steps of:
storing entries within a data store having a plurality of storage locations;
within an entry profile store, storing profile data for candidate entries to be stored in storage locations of said data store, said entry profile store serving to store profile data for more candidate entries than there are storage locations within said data store; and
in response to a miss in said data store, comparing said profile data stored in said entry profile store for at least a candidate entry and an existing entry, the comparing being triggered by a miss iii said data store, and controlling whether said candidate entry replaces said existing entry within a storage location of said data store in dependence on the comparison; wherein
said profile data includes performance gain data indicative of performance gains associated with use of respective candidate entries stored within said data store and said controlling preferentially stores candidate entries with a high associated performance gain when stored within said data store; and further comprising
updating said performance gain data in dependence upon cycle counts associated with actual use of a candidate entry when not stored within said data store; and updating said performance gain data in dependence upon cycle counts associated with actual use of a candidate entry when stored within said data store,
wherein said profile data includes confidence data indicative of probabilities of predictions made in dependence upon storing respective candidate entries within id data store being correct, and
wherein said controlling includes preferentially storing candidate entries with a high probability of resulting in a correct prediction when stored within said data stored.

19. Apparatus for processing data comprising:
data store means having a plurality of storage location means;
entry profile store means for storing profile data for candidate entries to be stored in storage location means of said data store means, said entry profile store means serving to store profile data for more candidate entries than there are storage location means within said data store means; and
entry replacer means for comparing, in response to a miss in said data store, said profile data stored in said entry profile store means for at least a candidate entry and an existing entry, the comparison being triggered by a miss its said data store, and controlling whether said candidate entry replaces said existing entry within a storage location means of said data store means in dependence on the comparison; wherein
said profile data includes performance gain data indicative of performance gains associated with use of respective candidate entries stored within said data store and said controlling preferentially stores candidate entries with a high associated performance gain when stored within said data store; further comprising
a profile updating means for updating said performance gain data in dependence upon cycle counts associated with actual use of a candidate entry when not stored within said data store; and for updating said performance gain data in dependence upon cycle counts associated with actual use of a candidate entry when stored within said data store,
wherein said profile data includes confidence data indicative of probabilities of predictions made in dependence upon storing respective candidate entries within said data store means being correct, and
wherein said entry replacer means is configured to preferentially store candidate entries with a high probability of resulting in a correct prediction when stored within said data store means.

* * * * *